US00H002286H

(19) United States
(12) Statutory Invention Registration
Lee

(10) Reg. No.: US H2,286 H
(43) Published: Dec. 3, 2013

(54) ROCKET MOTOR PROPELLANT SEGMENTING MACHINE

(75) Inventor: Jeffrey Lynn Lee, Athens, AL (US)

(73) Assignee: The United States of America as represented by the Secretary of the Army, Washington, DC (US)

(21) Appl. No.: 13/211,830

(22) Filed: Aug. 17, 2011

(51) Int. Cl.
*B23P 23/00* (2006.01)

(52) U.S. Cl. ..... 29/27 C
(58) Field of Classification Search ..... 29/27 C, 29/27 A
See application file for complete search history.

(56) References Cited

U.S. PATENT DOCUMENTS

| | | | | |
|---|---|---|---|---|
| 4,777,723 | A | 10/1988 | Southoff | |
| 6,023,983 | A | 2/2000 | Gerber | |
| 6,055,871 | A | 5/2000 | Gerber | |
| 2013/0042449 | A1 * | 2/2013 | Lee | 29/27 C |

* cited by examiner

*Primary Examiner*—Daniel Pihulic

(57) ABSTRACT

The invention relates to a machine for cutting a radial slice or segment of a metal casing-covered cylinder of rocket motor propellant. The machine includes: a channel cutter including a channel cutting tool in combination with a radial lathe; a kerf cutter including a kerf cutting tool in combination with the second radial lathe; a third radial lathe for positioning, tensioning and rotating an upper strand and a lower strand of diamond wire in relation to the cylinder of rocket motor propellant, the third radial lathe acting in combination with pneumatic cylinders, a pressurized air reservoir, at least two support brackets, and the upper strand and the lower strand of diamond wire; and a system support fixture for supporting and positioning the cylinder of rocket motor propellant and the first, second and third radial lathes during cutting of the circumferential channel, the kerf and the radial slice or segment.

1 Claim, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ROCKET MOTOR PROPELLANT SEGMENTING MACHINE

BACKGROUND

Large, solid propellant, rocket motors must be stored for decades and yet function with full effectiveness. To ensure this effectiveness, samples of the propellant are taken regularly from substantially complete serviceable or specimen motors for testing to determine if the propellant has remained stable. The propellants of interest are elastomers which are very tough and elastic so as to retain their shape and function despite shocks in transportation and the intense vibrations and thermal stresses that occur following ignition. The propellant is, typically, a single large "grain" cast within a generally cylindrical casing.

Because of the mechanical properties of these elastomeric propellants, the large size of the motors and samples, the inaccessibility of the propellant within the casing, and the dangers of ignition or detonation involved in cutting energetic materials, the prior art has no completely satisfactory method or device for obtaining the necessary samples.

BRIEF DESCRIPTION OF THE DRAWINGS

Features and advantages of embodiments of the instant disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
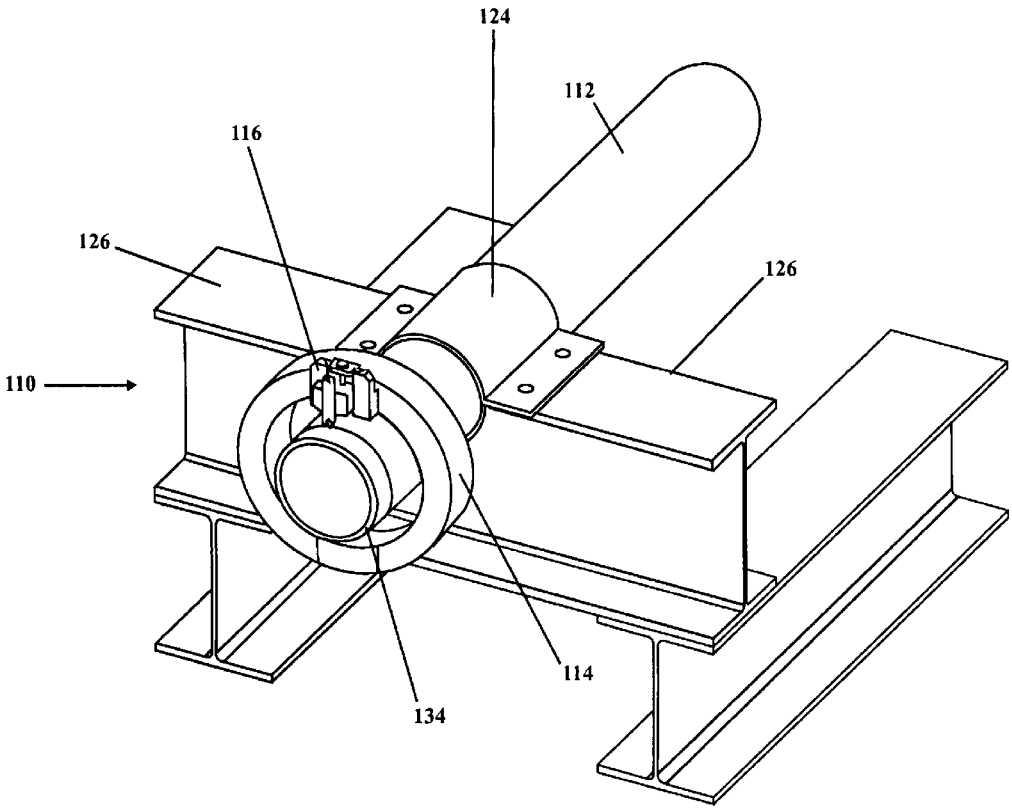
FIG. 1*a* is a perspective front view of an area of the machine of the instant invention during cutting of a circumferential channel in the metal casing of a cylinder of rocket propellant.

Referring now to FIG. 1*a*, a perspective front view of the machine 110 of the instant invention is shown. The area embodies the aspect of the instant invention relating to cutting a circumferential channel around the metal casing 134 covering the surface of a cylinder of rocket motor propellant 112. The channel cutting commences by placing the cylinder of rocket motor propellant 112 into a radial lathe 114. To the radial lathe 114 is connected a channel cutter 116. Besides the channel cutter 116 and the radial lathe 114, the area includes at least one support bracket 124 which helps secure the rocket motor propellant 112 as the action of the radial lathe 114 moves the channel cutter 116 around the circumference of the metal casing 134. The area also includes a system support fixture 126 supporting the cylinder of rocket motor propellant 112 along with the at least one support bracket 124.

Figure 1C:
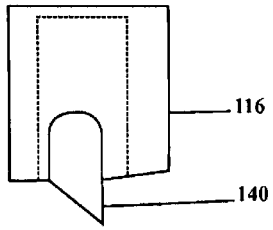
FIG. 1*c* is a side view of the channel cutter with the channel cutting tool inserted into it.
Figure 1B:
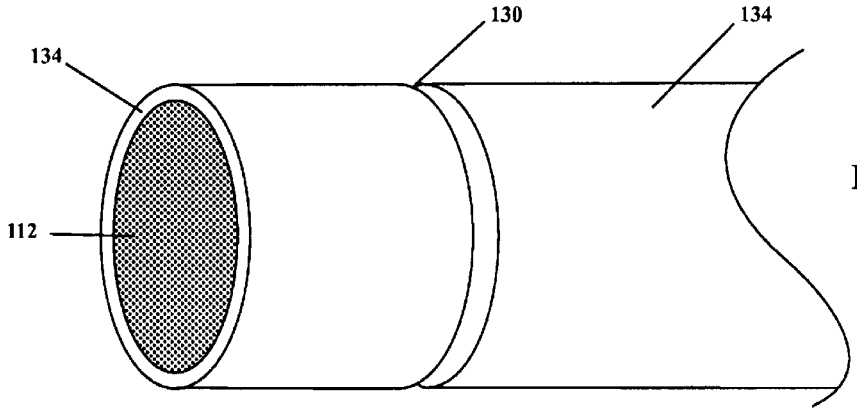
FIG. 1*b* is a perspective side view of a metal casing-covered cylinder of rocket propellant with a circumferential channel.

Referring now to FIG. 1*b*, a perspective side view of a metal casing 134 covering a cylinder of rocket propellant 112. The metal casing 134 has been cut all the way around the cylinder to form a circumferential channel 130 which has the majority of the metal removed but does not yet penetrate completely through the metal casing 134 to the material of the rocket propellant 112 itself.

In addition, FIG. 1*c* shows a side view of the channel cutter 116 with the channel cutting tool 140 inserted into it. As an example, the channel cutter 116 can be a pipe cutter with a pipe cutting tool inserted into it such as those manufactured by E. H. Wachs®.

Figure 2A:
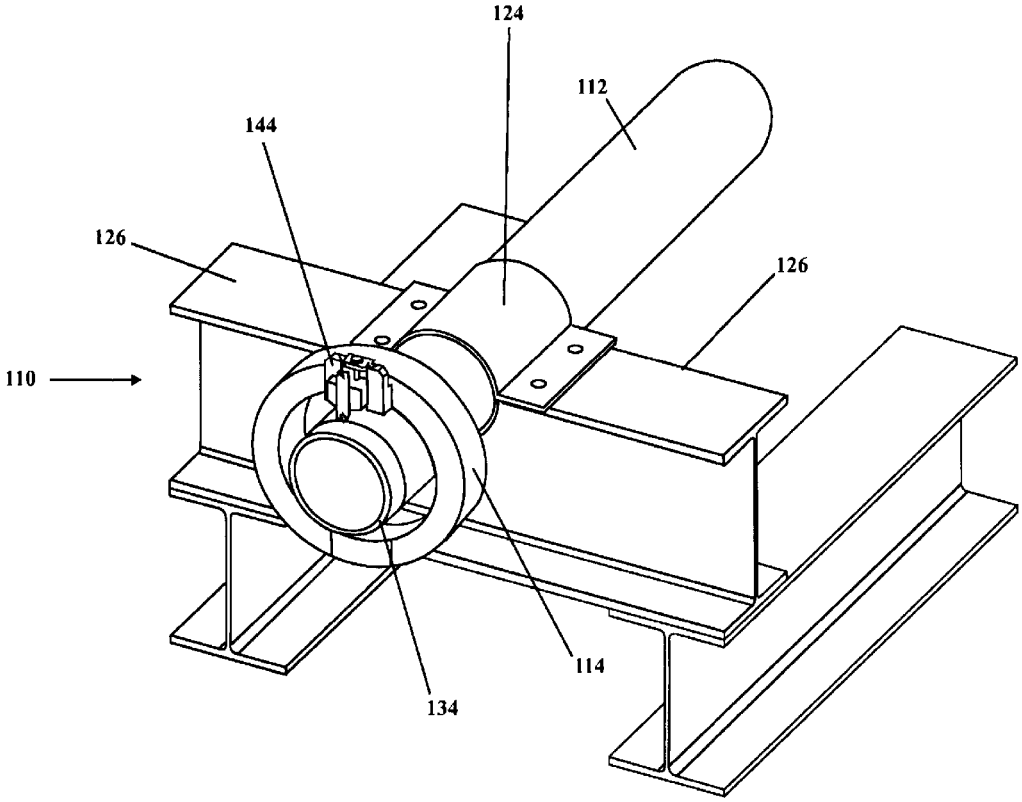
FIG. 2*a* is a perspective front view of an area of the machine of the instant invention during cutting of a kerf in the metal casing of a cylinder of rocket propellant.

Referring now to FIG. 2*a*, a perspective front view of the machine 110 of the instant invention is shown. The area embodies the aspect of the instant invention relating to cutting a kerf 128 around the metal casing 134 covering the surface of a cylinder of rocket motor propellant 112. The term "kerf" 128 as used in this application refers to a circumferential channel or band cut into the metal covering and penetrating completely through the metal covering all the way around the circumferential channel 130. The kerf cutting commences by placing the cylinder of rocket motor propellant 112 into a radial lathe 114. To the radial lathe 114 is connected a kerf cutter 144. Besides the kerf cutter 144 and the radial lathe 114, the area includes at least one support bracket 124 which helps secure the rocket motor propellant 112 as the action of the radial lathe 114 moves the kerf cutter 144 around the circumference of the metal casing 134. The area also includes a system support fixture 126 supporting the cylinder of rocket motor propellant 112 along with the at least one support bracket 124.

Figure 2C:
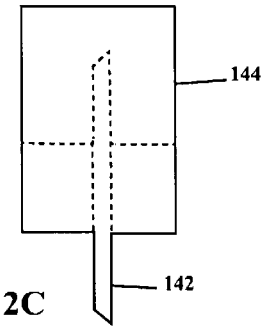
FIG. 2*c* is a side view of the kerf cutter with the kerf cutting tool inserted into it.
Figure 2D:
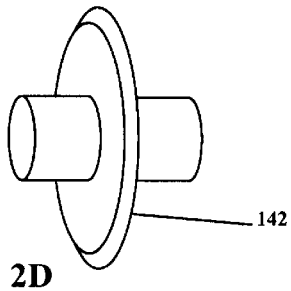
FIG. 2*d* is a side view of the kerf cutting tool removed from the kerf cutter.
Figure 2B:
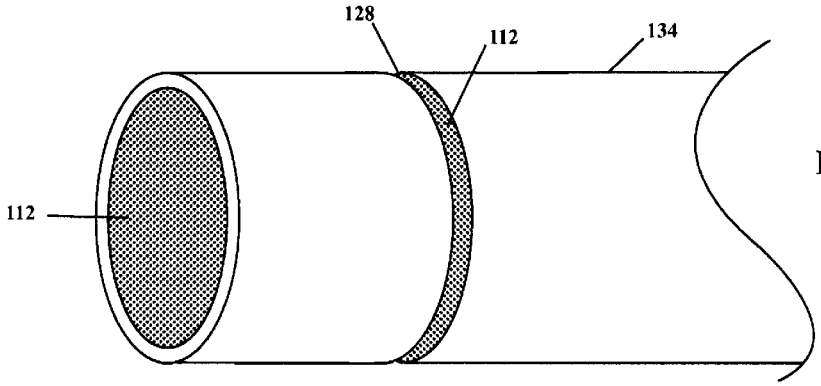
FIG. 2*b* is a perspective side view of a metal casing-covered cylinder of rocket propellant with the circumferential kerf.

Referring now to FIG. 2*b*, a perspective side view of a metal casing 134 covering a cylinder of rocket propellant 112 is shown. The metal casing 134 has been cut all the way around the cylinder and all the way through the metal casing 134 to form a kerf 128 which penetrates all the way through to reveal the material of the rocket propellant 112.

In addition, FIG. 2*c* shows a side view of the kerf cutter 144 fitted with the kerf cutting tool 142. As an example, the kerf cutter 144 used can be a pipe cutter such as those manufactured by E. H. Wachs®. FIG. 2*d* shows a further side view of the kerf cutting tool 142 alone which, in this example, is a half angle roller wheel which can be inserted into the kerf cutter 144 and function as a kerf cutting tool 142 to cut through the remaining metal to open up the circumferential channel 130 to form a kerf 128 which reveals the material of the rocket propellant 112.

Figure 3:
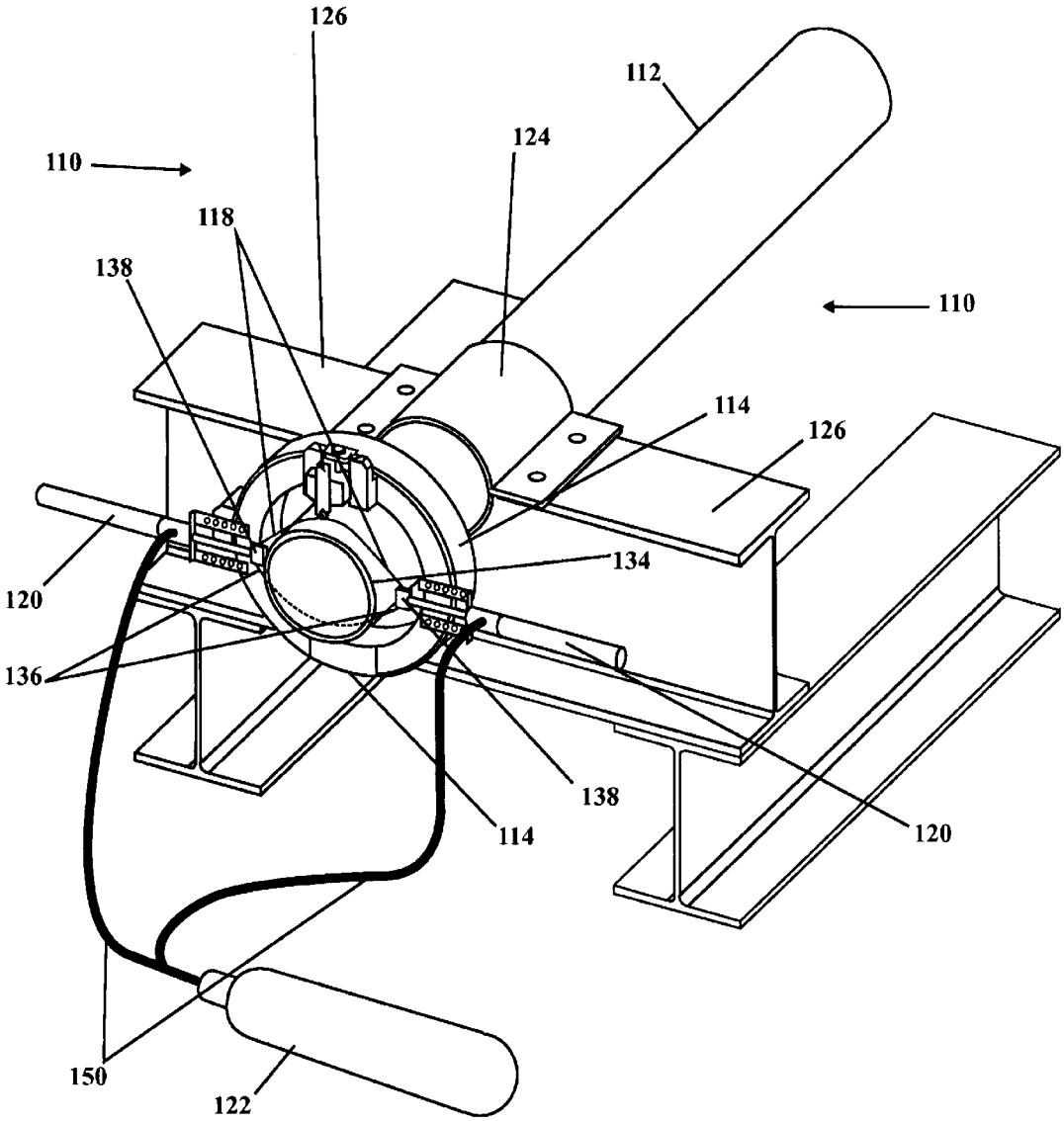
FIG. 3 is a perspective front view of an area of the machine of the instant invention during cutting of a segment of a cylinder of rocket propellant.

Referring now to FIG. 3, a cross-sectional side view of an area of the machine 110 of the instant invention is shown.

The area of the machine 110 embodies the aspect of the instant invention relating to the cutting of a slice/segment 132 of a cylinder of rocket motor propellant 112. This area of the machine 110 can cut through a cylinder of rocket motor propellant 112 covered by a metal casing 134 into which a kerf 128 has already been cut. The cutting commences by placing the cylinder of rocket motor propellant 112 into a radial lathe 114. The radial lathe 114 is connected to a device which includes a diamond wire having an upper strand 118 and a lower strand 136, each extending between two diamond wire support fixtures 138, the upper strand 118 extending circumferentially into the kerf 128 on the top of the cylinder of rocket motor propellant 112 and the lower strand 136 extending circumferentially into the kerf 128 on the bottom of the cylinder of rocket motor propellant 112. Thus when the upper strand 118 and lower strand 136 of the diamond wire are situated in the kerf 128 on opposite sides of the cylinder in direct contact on both upper and lower sides with the rocket motor propellant 112, the tension in the upper strand 118 and lower strand 136 is increased by the action of the machine 110 as the upper strand 118 and lower strand 136 are pulled apart by the diamond wire support fixtures 138. As the tension in the upper strand 118 and lower strand 136 increases, the upper strand 118 and lower strand 136 cut through the cylinder of rocket motor propellant 112 thus forming a circular slice/segment 132 of rocket motor propellant 112 encircled by a band 146 of cleanly cut metal covering. While the tension in the upper strand 118 and lower strand 136 is increasing, the radial lathe 114 in this area rotates the position of the upper strand 118 and the lower strand 136 from a horizontal to a vertical posture, the movement increasing the efficiency of the cutting action. Besides the upper strand 118 and lower strand 136 of diamond wire, there is also associated with the radial lathe 114, at least two pneumatic cylinders 120, at least two lengths of tubing 150 extending to a pressurized air reservoir 122, and at least one support bracket 124, all of which facilitate the tensioning, positioning and rotating of the upper 118 and lower 136 diamond wire strands. The machine 110 also includes a system support fixture 126 attached to the cylinder of rocket motor propellant 112 which along with the at least one support bracket 124 facilitates correct positioning and steadiness of the propellant 112 during machining.

Figure 4:
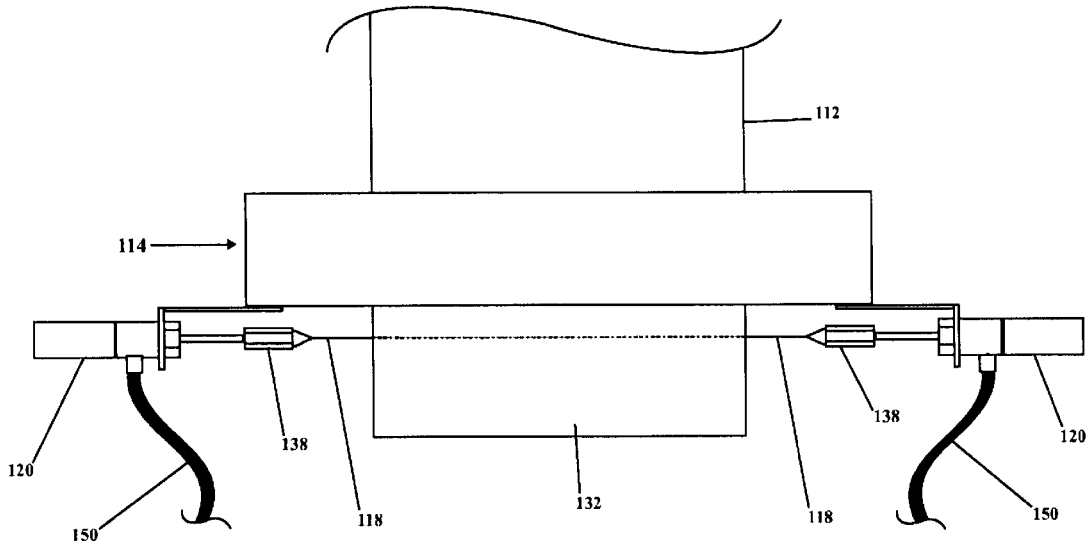
FIG. 4 is a downward view from above the machine of the instant invention during cutting of a segment of rocket propellant.

Referring more particularly to FIG. 4, a downward view from above the machine 110 including the radial lathe 114 of the instant invention during cutting of a radial slice/segment 132 of rocket motor propellant 112 is shown. The kerf 128 cut by the kerf cutter 144 forms a complete circumferential cut all the way through the metal casing 134 on the surface of the rocket motor propellant 112. The upper strand 118 and lower strand 136 of the diamond wire are positioned on the upper and lower areas of the kerf 128 respectively in relation to the cylinder of rocket motor propellant 112. The upper strand 118 and lower strand 136 of diamond wire are connected to diamond wire support fixtures 138 which in turn are connected to pneumatic cylinders 120, each of which has a length of tubing 150 extending to a pressurized air reservoir 122.

Figure 5:
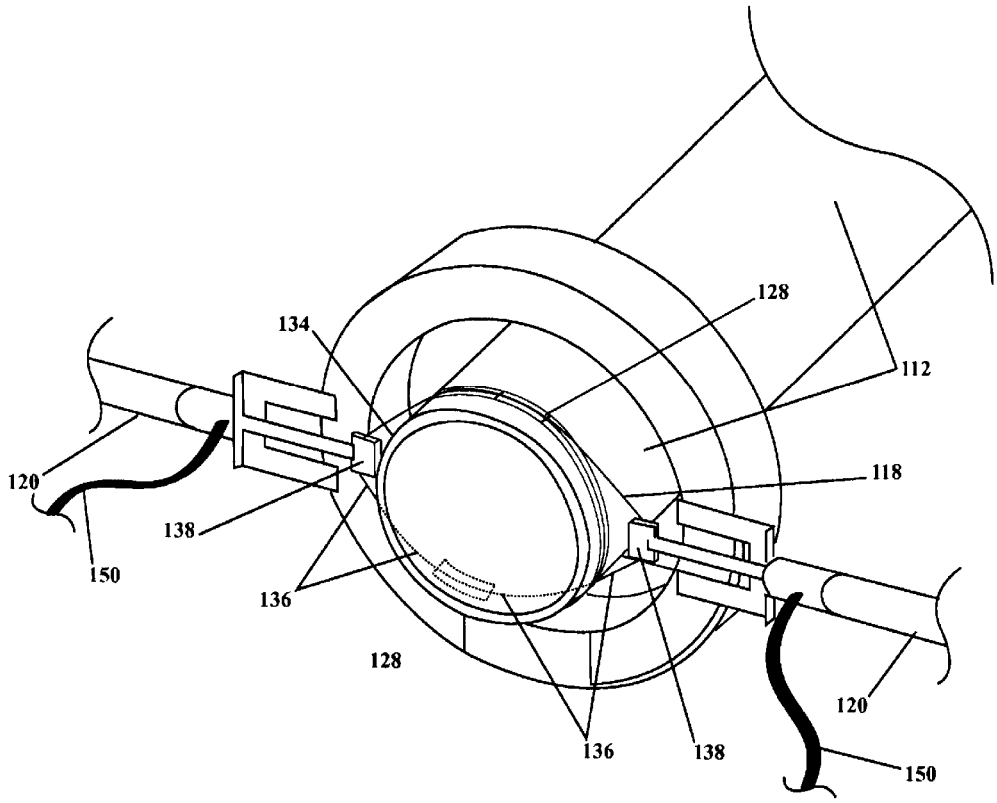
FIG. 5 is a perspective front view of the machine of the instant invention during cutting of a segment of rocket propellant.

Referring furthermore to FIG. 5, a perspective view of the front side of the machine 110 of the instant invention during cutting of a cylinder of rocket propellant 112 is shown. The radial lathe 114 is associated with the upper strand 118 and the lower strand 136 of the diamond wire which is placed in the kerf 128 on the upper and lower areas of the cylinder of rocket motor propellant 112 respectively. The upper 118 and lower 136 strands of diamond wire are connected to diamond wire support fixtures 138 each of which in turn is connected to pneumatic cylinders 120, which are connected to lengths of tubing 150 extending to a pressurized air reservoir 122.

Figure 6:
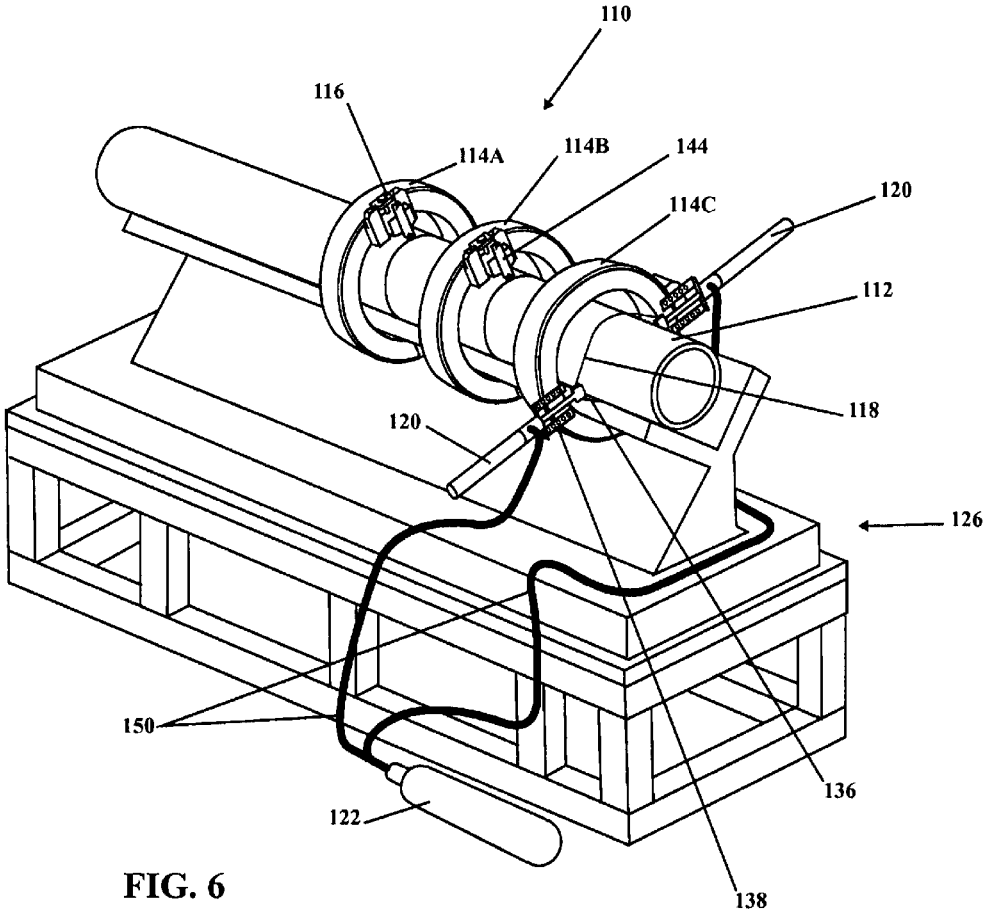
FIG. 6 is a perspective front view of the machine including areas for channel cutting, areas for kerf cutting and areas for segment cutting of a cylinder of rocket propellant.

FIG. 6 is a perspective front view of one embodiment of the machine 110. As shown, a system support fixture 126 securely holds a cylinder of rocket motor propellant 112. The system support fixture 126 allows the cylinder of rocket motor propellant 112 to pass smoothly along through a series of three radial lathes 114*a*, 114*b*, and 114*c*. The machine 110 includes an area for channel cutting with a radial lathe 114*a* to which is connected a channel cutter 116 and a channel cutting tool 140. The machine 110 also includes an area for kerf cutting with a radial lathe 114*b* to which is connected a kerf cutter 144 and a kerf cutting tool 142. In addition, the machine 110 includes an area for cutting slices/segments 132 of the cylinder of rocket propellant 112. This last area includes the radial lathe 114*c* which is connected to the system including the upper strand 118 and lower strand 136 of the diamond wire which in turn are situated in the kerf 128 on opposite sides of the cylinder, both the upper strand 118 and lower strand 136 being in direct contact with the rocket motor propellant 112. The upper 118 and lower 136 strands are held in place by the diamond wire support fixtures 138. As shown, the radial lathes 114*a*, 114*b*, and 114*c* are further associated with pneumatic cylinders 120, lengths of tubing 150 and a pressurized air reservoir 122.

Figure 7:
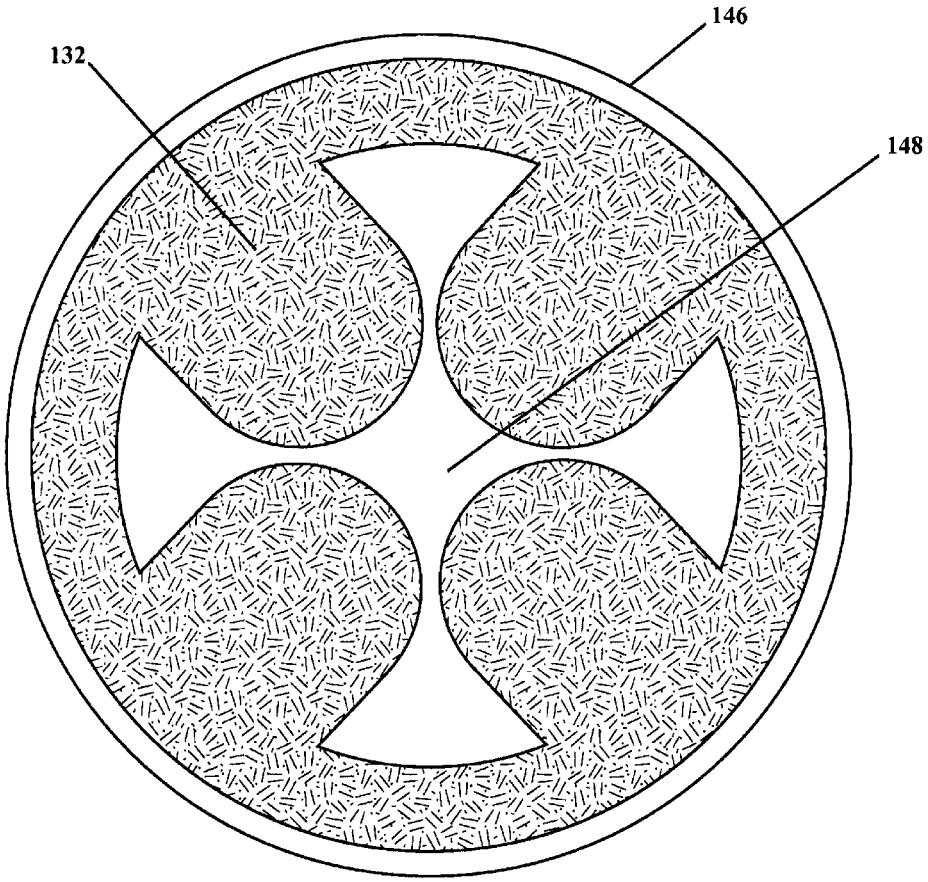
FIG. 7 is a cross section view of a complete segment cut from a cylinder of rocket motor propellant.

FIG. 7 is a cross section view of a complete slice/segment 132 cut from a cylinder of rocket motor propellant 112. As shown, the slice/segment 132 of propellant 112 is encircled by a metal band 146. Within the circular slice/segment 132 is a star-like pattern of unfilled space 148 extending from the center of the slice/segment 132. The unfilled space 148 at the center of the slice/segment 132 serves to ensure that the slice/segment 132 is sliced off cleanly even at the center of the slice/segment 132. This slicing occurs as the tension between the upper 118 and lower 136 strands of diamond wire are pulled tightly together from opposite sides of the kerf 128 into the center of the propellant 112 while at the same time being rotated at least 90° around the kerf 128 of the propellant 112 by the radial lathe 114.

While several embodiments have been described in detail, it will be apparent to those skilled in the art that the disclosed embodiments may be modified. Therefore, the foregoing description is to be considered exemplary rather than limiting.

The invention claimed is:

1. A machine for cutting a radial slice or segment of a metal casing-covered cylinder of rocket motor propellant, wherein, firstly, the radial slice or segment is formed by cutting a circumferential channel around the metal casing with a channel cutting tool, the circumferential channel being cut less than fully through the metal casing; then secondly, further cutting the circumferential channel of the metal casing with a kerf cutting tool that cuts fully through the circumferential channel and forms a kerf circumferentially around the cylinder; then thirdly, placing a top strand and a bottom strand of diamond wire horizontally in the kerf on the cylinder parallel to each other and in a top position and a bottom position on the cylinder respectively; then fourthly, horizontally cutting the cylinder with the top strand and the bottom strand at the top and bottom positions respectively of the kerf by increasing tension in the top strand and the bottom strand and decreasing distance between the top strand and bottom strand while the strands continue to be parallel to each other; then fifthly completing the cutting of the cylinder by continuing to increase tension in the top strand and bottom strand and decrease distance between the top strand and bottom strand while rotating the top strand and bottom strand at least 90° in relation to the kerf while the strands still continue to be parallel to each other, wherein the top and bottom strands thus cut the cylinder completely through to the center of the cylinder forming the radial slice or segment, the machine comprising:

a channel cutter including the channel cutting tool in combination with a first radial lathe;

a kerf cutter including the kerf cutting tool in combination with a second radial lathe;

a third radial lathe for positioning, tensioning and rotating the upper strand and the lower strand of diamond wire in relation to the cylinder of rocket motor propellant, the third radial lathe acting in combination with pneumatic cylinders, a pressurized air reservoir, at least one support bracket, and the upper strand and the lower strand of diamond wire; and a system support fixture for supporting and positioning the cylinder of rocket motor propellant and the first, second and third radial lathes during cutting of the circumferential channel, the kerf and the radial segment or slice.

* * * * *